Dec. 17, 1935.  M. B. ROY  2,024,878
DEFROSTER
Filed Sept. 12, 1934
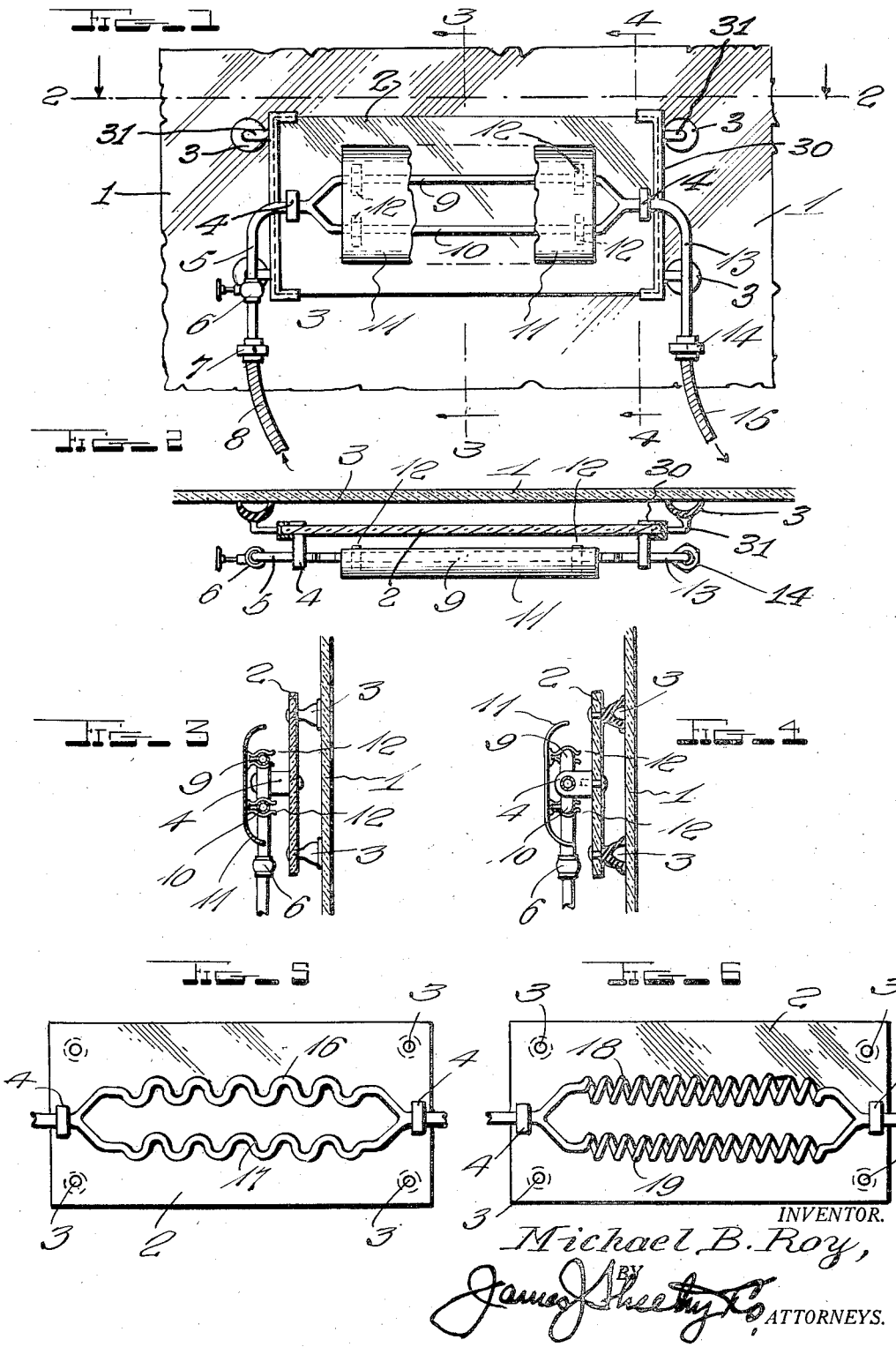
INVENTOR.
Michael B. Roy,
BY
ATTORNEYS.

Patented Dec. 17, 1935

2,024,878

UNITED STATES PATENT OFFICE 2,024,878

DEFROSTER

Michael B. Roy, Bridgeport, Conn.

Application September 12, 1934, Serial No. 743,774

3 Claims. (Cl. 20—40.5)

This invention relates to defrosting devices especially adapted to be applied to wind shields of automobile machines and it consists in the novel features hereinafter described and claimed.

An object of the invention is to provide a device of the character stated which is of simple and durable structure and which may be easily and quickly applied and designed to use the exhaust gases from the engine of an automobile for the purpose of keeping the wind shield at such degree of temperature as to prevent the accumulation of frost thereon and to remove frost therefrom in the event that such frost has previously accumulated thereon.

With the above object in view the device consists of a transparent plate mounted upon suction cups which may be applied to the wind shield there being brackets upon the plate which support a pipe section and there being a shield applied to the said pipe section. The pipe section is provided with connections for leading in the exhaust and for leading the same out. The pipe section, between the brackets, is approximately parallel with the plane of the plate and is formed in branches which are curved or corrugated thereby compelling the heated gases to travel in tortuous courses through the pipe section so that the heat radiating from the pipe section and the heated gases may impinge upon the transparent plate and the wind shield and prevent the formation of frost or remove frost therefrom.

Other objects and advantageous characteristics will be readily understood from the following description and claims when read in connection with the drawing accompanying and forming part of the specification, in which Figure 1 is a fragmentary side elevational view of a wind shield with the defrosting device applied and parts thereof broken away.

Figure 2 is a horizontal sectional view cut on the line 2—2 of Figure 1.

Figure 3 is a transverse sectional view cut on the line 3—3 of Figure 1.

Figure 4 is a similar view cut on the line 4—4 of Figure 1.

Figure 5 is a plan view of a plate with a modified form of pipe section thereon.

Figure 6 is a plan view of a plate with yet another modified form of pipe section thereon.

Similar numerals of reference designate corresponding parts in all of the views of the drawing.

The wind shield of the automobile machine is of a sheet of glass as usual and is shown at 1. The defrosting device consists of a glass plate 2 mounted upon suction cups 3 and said suction cups may be applied to the wind shield 1 in a usual manner and as best shown in Figures 2, 3 and 4 of the drawing. Brackets 4 are mounted upon the plate 2 and a plate 5 is connected with one of the brackets. The pipe 5 is provided with a valve 6 and a union 7 by means of which it is connected with the exhaust gas in inlet pipe 8. The suction cups 3 are secured to the frame 30 by means of the arms 31 and manifestly as shown in Figure 2 the plate 2 will be only slightly positioned with a space from the windshield 1 of the vehicle. This arrangement will cause the heat that passes through the members 9 and 10 to heat the plate 2 and this heat in turn will be imparted to the windshield thereby defrosting said windshield.

As shown in Figures 1 to 4 inclusive the pipe 5 is connected with a pipe section having branches 9 and 10 which lie between the brackets 4 and which are spaced from the plate 2. A shield 11 is provided with clips 12 which engage upon the branches 9 and 10 and form supports for holding the shield so that heat passing through the branches is reflected against the shield upon the plate 2 and the wind shield 1. A pipe 13 connected with the other bracket 4 and is provided with a union-nut 14 by means of which it is connected with the exhaust or outlet pipe 15.

In operation the heated gases from the pipe 8 enter the pipe 5 and pass into the branches 9 and 10 of the pipe sections and heat the plate and wind shield as hereinbefore indicated. The heat thus applied prevents the accumulation of frost and removes any frost which may have deposited upon the wind shield. The heated gases pass out of the pipe section through the pipes 13 and 15.

In the form of the device as shown in Figure 5 of the drawing, the branches 16 and 17 of the pipe section are corrugated and extend approximately parallel with the plane of the plate 2. In this form of the invention the heated gases are impeded or deterred in passing through the branches of the pipe section and hence ample time elapses to permit the heat to radiate from the branches to the wind shield for the purposes intended.

In the form of the invention as shown in Figure 6 of the drawing the pipe branches 18 and 19 are coiled to yet further impede the progress of the passage of the heated gases through the said branches.

From the above description taken in conjunction with the accompanying drawing it will be seen that an efficient defrosting device is provided and that the same may be used to advantage for automatically maintaining the wind shield of an automobile machine free from the accumulation and deposit of frost upon the surface thereof which if permitted to accumulate materially interferes with the scope of vision of the operator of the automobile machine.

What I claim is:—

1. A defrosting device comprising a transparent plate, a frame secured on the ends of the plate, brackets secured to the frame and suction cups mounted on the brackets whereby said plate may be attached in close proximity to a vehicle windshield, a heating element mounted in rear of the plate and having conduits secured to the exhaust of the vehicle and comprising a series of pipes connected with the conduits whereby the exhaust elements heat the plate.

2. A defrosting device comprising a transparent plate, means for securing the plate in close proximity to the windshield of a vehicle and a heating device arranged in rear of the plate and in close proximity to said plate and adapted to conduct heat from the exhaust of the vehicle so that such heat is imparted to the plate and in turn to the windshield.

3. A defrosting device comprising a transparent plate, means for attaching the plate to a vehicle windshield with but a slight intervening space between said plate and windshield, and a heating unit secured to the plate and comprising pipes in communication with the exhaust elements of the vehicle whereby such elements may be imparted to the plate and in turn to the windshield.

MICHAEL B. ROY.